United States Patent [19]
Wilkerson et al.

[11] Patent Number: 5,920,018
[45] Date of Patent: Jul. 6, 1999

[54] REAL TIME VOLUMETRIC FLOW SENSOR

[75] Inventors: John B. Wilkerson; Fred Henry Moody, III; Joseph Shellie Kirby, all of Knoxville, Tenn.

[73] Assignee: The University of Tennessee Research Corporation, Knoxville, Tenn.

[21] Appl. No.: 08/764,669

[22] Filed: Dec. 11, 1996

[51] Int. Cl.⁶ ................................................ G01F 13/00
[52] U.S. Cl. ........................................................ 73/861.41
[58] Field of Search .......................... 73/861.41, 61.71, 73/61.41; 356/343

[56] References Cited

U.S. PATENT DOCUMENTS

| | | |
|---|---|---|
| 3,863,428 | 2/1975 | Baxter . |
| 4,068,223 | 1/1978 | Steffen . |
| 4,286,424 | 9/1981 | Hubbard . |
| 4,307,390 | 12/1981 | Steffen et al. . |
| 4,333,096 | 6/1982 | Jenkins et al. . |
| 4,441,513 | 4/1984 | Herwig . |
| 4,635,047 | 1/1987 | Fox et al. . |
| 4,681,569 | 7/1987 | Coble et al. ............................ 604/253 |
| 4,718,269 | 1/1988 | Der Kinderen ........................ 73/61.71 |
| 4,961,304 | 10/1990 | Ovsborn et al. ........................ 56/10.2 |
| 5,063,729 | 11/1991 | Fox et al. . |
| 5,456,102 | 10/1995 | Moorehead ................................... 73/3 |
| 5,480,354 | 1/1996 | Sadjadi . |
| 5,638,174 | 6/1997 | Henderson .............................. 356/343 |

Primary Examiner—George M. Dombroske
Assistant Examiner—Jewel Thompson
Attorney, Agent, or Firm—Mayer, Brown & Platt

[57] ABSTRACT

A sensor for non-intrusively measuring the volumetric flow rate of materials, such as cotton, in a confined air stream is disclosed. The sensor is mounted on a conduit through which an air entrained material such as cotton flows. The sensor has an emitter unit having a number of light sources such as an LED which emit light beams normal to the longitudinal axis of the conduit. The sensor also has a detector unit which detects the light beams from the light sources. The light beams are detected by light-to-frequency circuits which generate a signal indicative of the sensed light. The light beams are attenuated depending on the amount of material passing through the conduit. The generated signal is sent to a counter circuit. The counter outputs are coupled to a processor circuit which calculates the quantity of material flowing through the light beam as a function of the frequency signal and a baseline frequency signal indicative of the level of light detected when no material is flowing through the light beam.

23 Claims, 6 Drawing Sheets

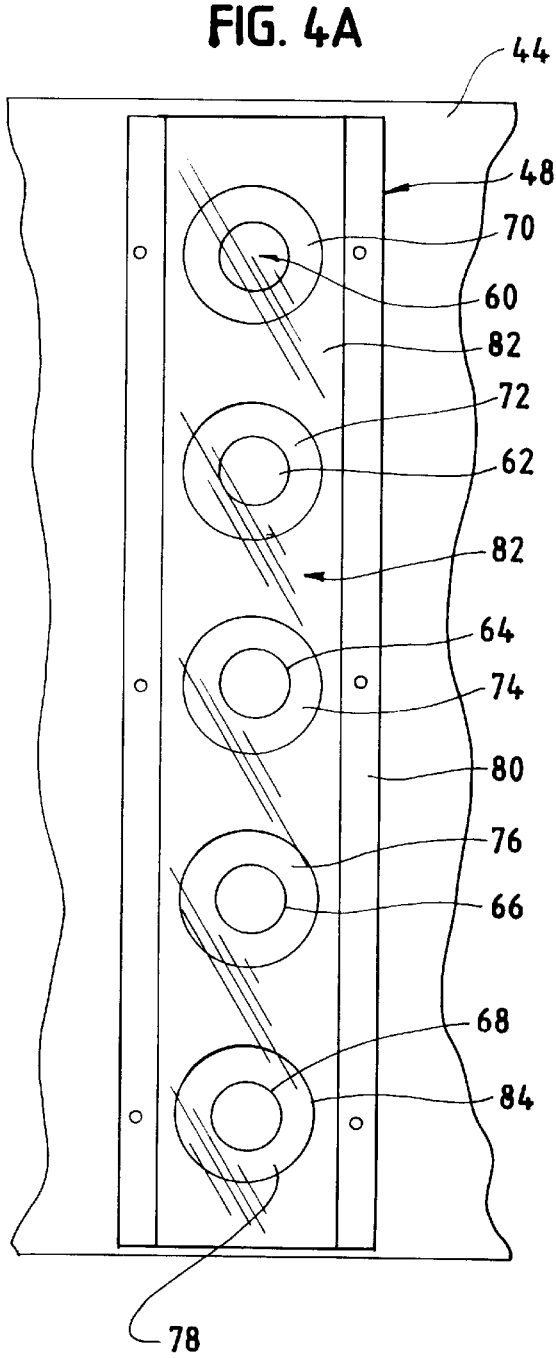
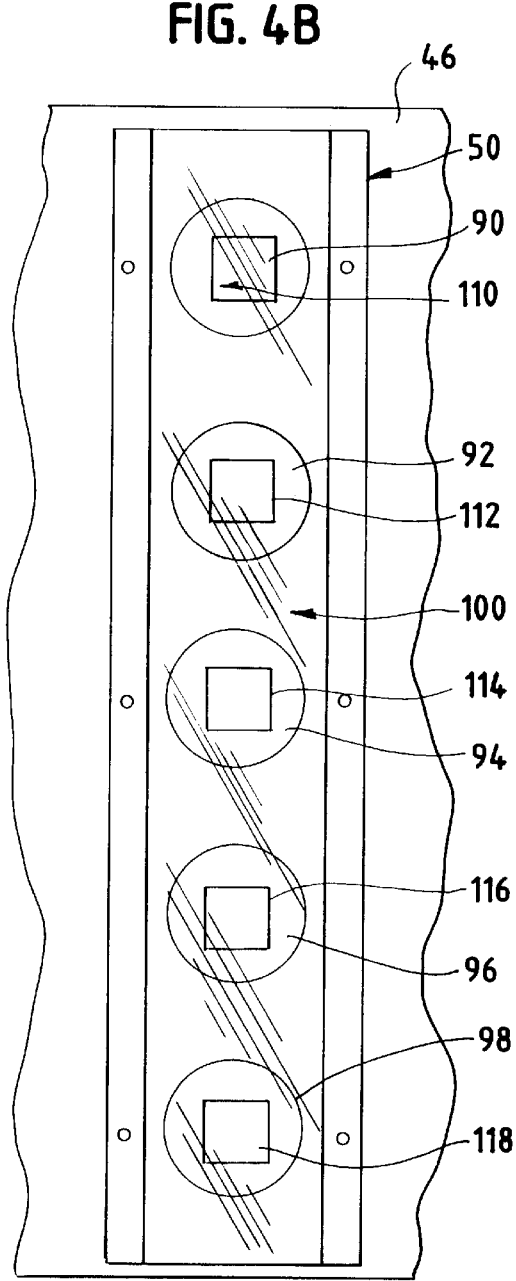

REAL TIME VOLUMETRIC FLOW SENSOR

FIELD OF INVENTION

This invention relates to an apparatus and method for determining the quantity of material being transported through a passage and more specifically, to an apparatus and method using a non-intrusive sensor which measures the quantity of material such as air entrained cotton flowing past the sensor.

BACKGROUND OF INVENTION

Large quantities of bulk particulate materials such as agricultural crops are often transported through ducts, conduits, pipes and the like to an accumulation area for processing or utilization. It is often desirable to measure the quantity of material during its transport or after it is accumulated. One example where it is desirable to measure the amount of materials is in the area of calculation of agricultural crop yields. The management of contemporary agricultural operations makes it highly advantageous to accurately determine the quantities of crops being harvested from each area within any given field. For example, knowledge of the productivity of individual field areas allows the grower to adjust application of fertilizer, irrigation, and herbicides to maximize crop yields.

Until recently, crop yields have been largely determined on the basis of an entire field, without the ability or the need to obtain information as to the yields in different locations in a field. Generally, crops were recovered, conveyed to a weighing site, weighed with the transporting vehicle or the container, and the weight of the vehicle or container subtracted from the gross weight to obtain the amount of product recovered. This procedure is not dynamic in nature and cannot be adapted to real time collection of data which is necessary for analysis of yields collected from individual field areas.

Systems which can measure crop yields as crops are harvested have been previously used in conjunction with mobile harvesters. Typically, a mobile harvester moves over a field picking crops and simultaneously storing the picked crops in a receptacle mounted on the harvester. One system involves weighing the crop receptacle and the crops in the receptacle as the harvester moves through the field. However, machine dynamics and the large receptacle weight to crop weight ratio lead to serious errors when measurements are made on a real time basis.

A different existing real time measurement system operates by conveying the crops to the receptacle by means of an airstream. The airstream is directed in such a manner that the conveyed material impinges on a pressure plate that is connected to a pressure transducer which creates a real time pressure signal indicative of the amount of materials striking the plate. This permits real time determination of the quantity of material that is flowing into the receptacle, the quantity being proportional to the pressure on the plate. This system is useful because it may be installed on mobile harvesting equipment for the measurement of crop yields as the crops are harvested. Additionally, the real time measurement of crop flow will show interruptions in the crop flow which provide indications of equipment malfunction.

Although this latter system could in theory permit recognition of the quantities of crops recovered from different areas within a field, it is not suitable for use when harvesting certain crops, such as cotton. Cotton and similar crops adhere to the pressure plate, thus inhibiting the flow of the cotton to the receptacle. Additionally, as more cotton accumulates on the pressure plate, inaccurate measurements are taken. Finally, it has been found that the pressure plate system cannot be effectively installed on existing cotton harvesting machinery.

Thus, a need exists for a flow rate sensor which does not impede the flow of entrained material. Furthermore, there is a need for a sensor to accurately obtain real time flow data for entrained material. Also, there is a need for a flow sensor which may be installed on existing cotton harvesting machinery. Finally, a sensor is desired which can correct for errors and maintain accurate data measurements.

SUMMARY OF THE INVENTION

The purpose and advantages of the present invention will be set forth in and apparent from the description that follows, as well as will be learned by practice of the invention. Additional advantages of the invention will be realized and attained by the methods and apparatus particularly pointed out in the written description as well as from the appended drawings.

In view of the above needs, a flow sensor for use with a material transport system is disclosed which overcomes difficulties found in existing systems. The material transport system has a conduit defining a flow passage through which entrained materials are transported between inlet and outlet ends of the conduit in a direction parallel to the longitudinal axis of the conduit. The flow sensor has an emitter unit including a light source positioned to project a light beam through the flow passage in a direction normal to the longitudinal axis of the conduit. The flow sensor also has a detector unit positioned substantially opposite the emitter unit to receive light passing through the flow passage and convert light into a generated signal indicative of the level of light detected. A processor circuit is coupled to the detector unit. The processor circuit calculates the quantity of material in the flow passage passing through the light beam as a function of the detector unit generated signal and a baseline signal indicative of the level of light detected when no material is flowing through the light beam.

Additionally, the present invention is a method to determine the quantity of air entrained materials flowing through a material transport system having a conduit defining a flow passage through which entrained materials are transported between inlet and outlet ends of the conduit in a direction parallel to the longitudinal axis of the conduit. The method includes projecting a light beam through the flow passage in a direction normal to the longitudinal axis of the conduit. The light is detected from the light beam passing through the flow passage. The light is converted into a generated signal indicative of the level of light detected. The quantity of material in the flow passage passing through the light beam is then calculated as a function of the generated signal and a baseline signal indicative of the level of light detected when no material is flowing through the light beam.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 4A is a forward view of the emitter unit of the flow sensor according to the present invention.

FIG. 4B is a forward view of the detector unit of the flow sensor according to the present invention.

DESCRIPTION OF THE PREFERRED EMBODIMENT

Figure 1:
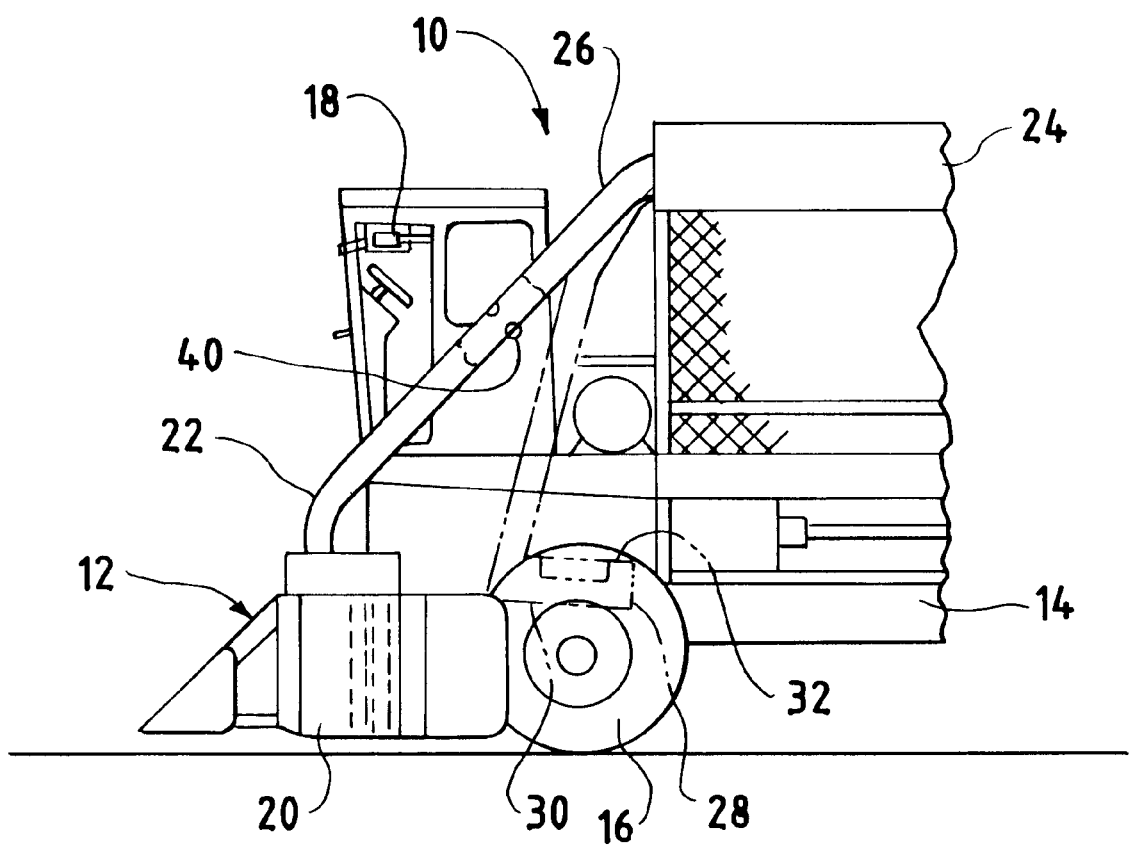
FIG. 1 is a side view of a front portion of a crop harvester having the flow sensor of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

The present invention relates to a flow sensor for use in a material transport system having a conduit defining a flow passage through which entrained materials are transported between inlet and outlet ends of the conduit. As will be explained, the flow sensor may be used for a wide variety of harvesting and transport equipment which require transporting materials through a flow passage and where it is desirable to measure the quantities of these materials flowing through the passage. One example of such equipment is a cotton harvester With reference to the drawings, wherein like reference numerals indicate like parts throughout the drawings, FIG. 1 shows a crop harvester 10 having a flow sensor 40 embodying the principles of the present invention. The crop harvester 10 may be a Model 2155 Five Row Cotton Picker manufactured by J.I. Case Corporation, for example, although the present invention may be applied to any type of crop harvester or stationary equipment which transports materials.

The crop harvester 10 includes a number of picking units 12 arranged at a forward end of a frame 14 for picking crops from plants. The picking units 12 pick cotton from cotton plants as the harvester 10 moves forwardly over a field on wheels 16. A cab 18 mounted on the frame 14 is provided for an operator to operate the harvester 10.

Each picking unit 12 includes an upright housing 20, forward and rear picker drums (not shown) for removing cotton from the plants, and doffer assemblies (not shown) for removing the cotton from the forward and rear picker drums. A conveying system 22 is provided for directing the harvested crops from each picking unit 12 to a crop storage receptacle 24 mounted on the frame 14 of the cotton harvester 10. The crop storage receptacle 24 receives the picked crops, such as cotton, and stores the picked crops for transport.

The cotton conveying system 22 includes a conduit 26 associated with the forward picking drum of the picking unit 12 and a conduit (not shown) associated with the rear picking drum. Each picking unit has similar conduits. Conduit 26 provides a flow passage between the forward picking drum of the picking unit 12 and the receptacle 24. The conduit 26 is preferably formed from sheet metal, although materials such as plastics may be used. A blower mechanism 28 is connected to the conduit 26 to create an air flow to draw the picked crops from the picking unit 12 through the conduit 26 and into receptacle 24. This creates material flow parallel to the longitudinal axis of the conduit 26.

The blower mechanism 28 has a fan 30 which moves air to the drums of the picking unit 12 creating an air jet that draws the crops out of the doffers by the vacuum created by the air jet and propels them through conduit 26. The air jet produced by fan 30 propels the harvested crops upwardly through conduit 26 into the receptacle 24. A fan speed sensor 32, which may be a passive proximity sensor, is mounted on the fan 30. The fan speed sensor 32 detects the speed of the fan 30 which is exponentially related to the velocity of the air jet.

Figure 2:
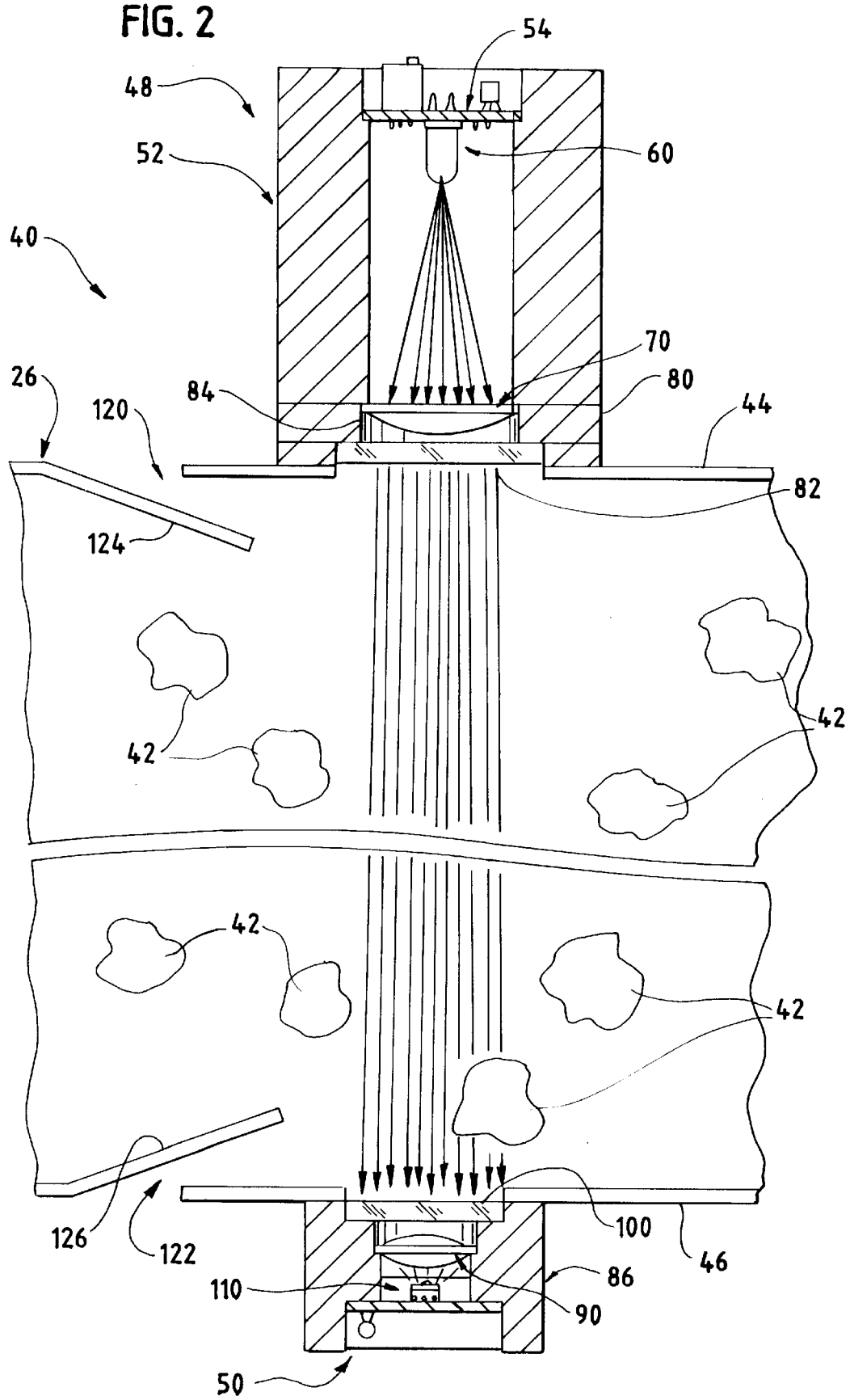
FIG. 2 is a side view of the flow sensor mounted in a conduit according to the present invention.
Figure 3:
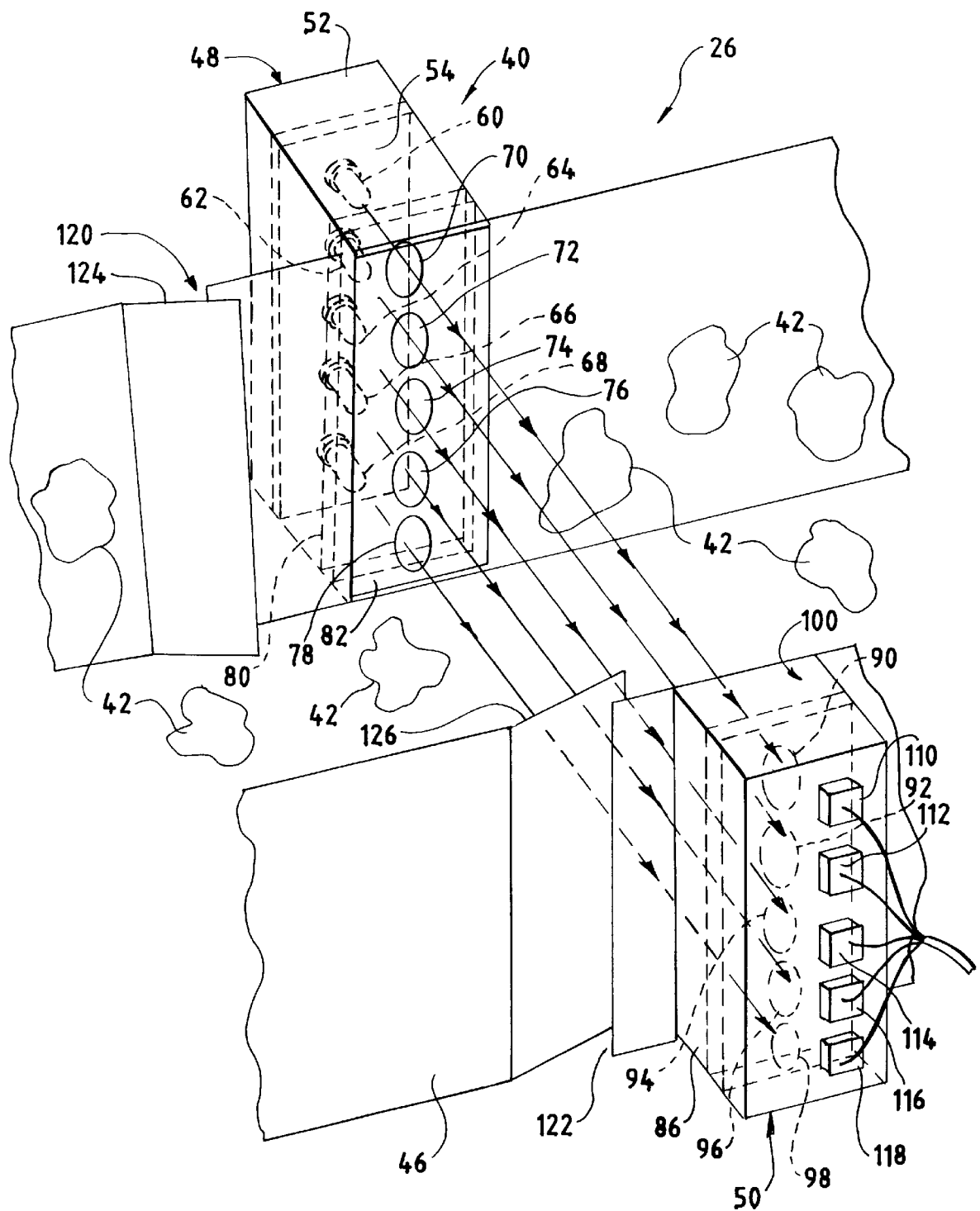
FIG. 3 is a cutaway perspective view of the conduit mounting the flow sensor according to the present invention.

The flow sensor 40 developed in accordance with the present invention is mounted on the conduit 26. It will of course be appreciated that each of the conduits attached to each of the picking units has its own flow sensor similar to flow sensor 40. The components of the flow sensor 40 will now be explained with references to FIGS. 2–4. Referring to FIG. 2, there is shown a side view of the flow sensor 40 mounted on the conduit 26. FIG. 3 shows a cutaway perspective view of the conduit 26 with the flow sensor 40 mounted on the conduit 26. FIG. 4A shows a forward view of the emitter unit of the flow sensor 40 and FIG. 4B shows a forward view of the detector unit of the flow sensor 40.

The conduit 26 forms a flow passage for entrained material 42, such as cotton, to be transported to the receptacle 24. The conduit 26 is here illustrated as having four walls, including side walls 44 and 46, which define a flow passage having a substantially rectangular cross section. The flow sensor 40 has an emitter unit 48 mounted on side wall 44 and a detector unit 50 mounted on side wall 46. The emitter unit 48 is approximately the same height of the sidewall 44. The emitter unit 48 has a rectangular housing 52 which holds a printed circuit board 54. The printed circuit board 54 is generally rectangular in shape and fits in the cross section of the rectangular housing 52.

Emitter unit 48 includes a number of light sources such as narrow beam light emitting diodes (LEDs) 60, 62, 64, 66 and 68 which are mounted along the length of the circuit board 54. The LEDs 60–68 each project a light beam through the flow passage in a direction normal to the longitudinal axis of the conduit 26. The LEDs 60–68 are spaced along the height of the sidewall 44. In a preferred embodiment, the LEDs 60–68 produce light in the visible spectrum. However, use of LEDs which emit light in the infra red spectrum may be desirable in applications where impurities such as dust particles have a greater tendency to attenuate the light beams. As explained below, different numbers of light sources with different spacing may be used if desired. For example, light sources spaced at closer intervals may be desired for greater accuracy of flow rate determination.

A series of light focusing lenses 70, 72, 74, 76 and 78 are mounted on a base support 80 which is positioned at a fixed distance from the printed circuit board 54. The light focusing lenses 70–78 are single convex lenses, in the preferred embodiment. A rectangular light transparent window 82 is located between the flow of materials 42 and the LEDs 60–68 in sidewall 44 and the lens 70–78 are placed between the window 82 and the LEDs 60–68. Window 82 protects the lenses 70–78 from all materials carried in the airstream passing through the conduit 26.

The circuit board 54 is positioned within housing 52 in such a manner that each LED 60–68 is centered at a fixed distance from the focusing lenses 70–78. Each lens 70–78 is secured in the base support 80 over holes 84 machined in the base support 80, such that radiation from one LED will not strike an adjacent lens. This geometric arrangement results in individually focused beams of visible light being transmitted normal to the longitudinal axis of the conduit 26.

The detector unit 50 is positioned substantially opposite the emitter unit 48 to receive the light passing through the flow passage of the conduit 26 and convert the light into a generated signal indicative of the level of light detected as explained below. The detector unit 50 has a rectangular housing 86 which is attached to the side wall 46.

The housing 86 holds a series of five light receiving double-convex lenses 90–98. The double-convex lenses 90–98 are protected from dust and other particles generated by the material flow through the conduit 26 by a light transparent window 100 mounted in the sidewall 46 of the conduit 26. The window 100 is mounted opposite the sidewall 44 containing the window 82.

Light beams from the LEDs 60–68 of the emitter unit 48 strike the double convex lenses 90–98 in the detector unit 50 which act to focus the light radiation from the LEDs onto the surfaces of light-to-frequency integrated circuits 110, 112, 114), 116 and 118. In the preferred embodiment, the light-to-frequency integrated circuits 110–118 are TSL235 model digital light-to-frequency converters manufactured by Texas Instruments. The TSL235 provides a wide linear frequency output range proportional to the light energy striking the circuit. The TSL235 is optimized for operation in the visible light range in the preferred embodiment. Other photodetector circuits may be used if the light sources in the emitter unit 48 produce light with a peak wavelength outside the visible range. For example, if infra-red light sources are used, light-to-frequency circuits capable of detecting infra-red light are used in the detector 50.

The output frequency from each light-to-frequency integrated circuits 110–118 is linearly proportional to the level incident light energy which is detected by the circuit. The use of the integrated circuits 110–118 in the preferred embodiment eliminates the need for individual analog components. However, a circuit having a photodiode coupled to a current-to-voltage converter connected to a high speed analog-to-digital converter may be substituted for any of the circuits 110–118. In this circuit, a voltage to frequency converter may be used instead of the analog-to-digital converter.

The sidewalls 44 and 46 have slits 120 and 122 which permit air flow from outside the conduit 26 into the flow passage. The slits 120 and 122 are located upstream of the windows 82 and 100. Louvers 124 and 126 extend inwardly into the flow passage from the vicinity of an upstream edge of the slits 120 and 122 to cause aspiration of air into the flow passage and thereby provide a layer of air over the windows 82 and 100 preventing accumulation of particles on the windows 82 and 100. The layer of air introduced through the slits 120 and 122 protects the glass windows 82 and 100 from foreign particles being transported with the flow of materials 42. If desired, a filter screen may be installed over the slits 120 and 122 to prevent foreign particles from entering the conduit 26 and causing accumulation of particles on the windows 82 and 100.

Figure 5:
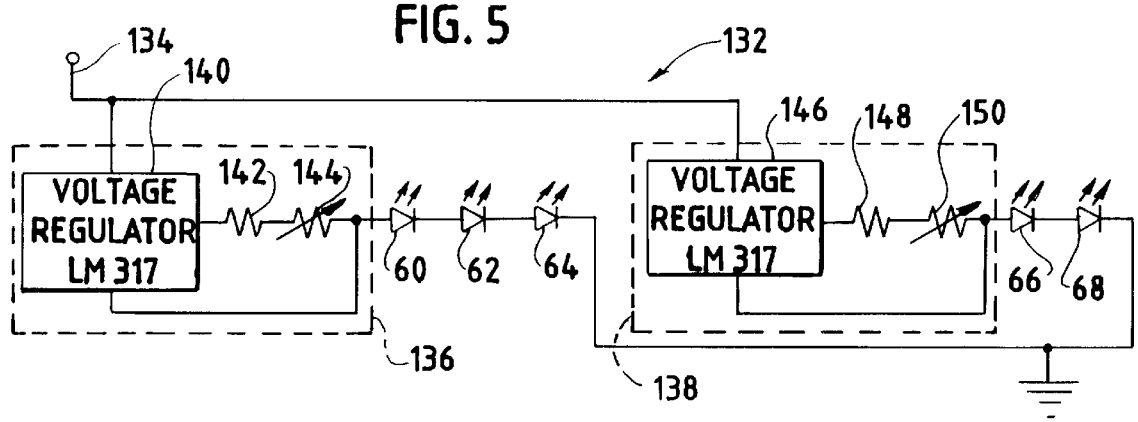
FIG. 5 is a circuit diagram of the current regulation circuit for the LEDs of the flow sensor according to the present invention.

FIG. 5 is a circuit schematic of a current regulating circuit 132 used to regulate the current through the LEDs 60–68. The current regulating circuit 132 is located on the circuit board 54 in the present embodiment. Other power sources may be used or the current regulating circuit 132 may be located remotely from the emitter unit 48. In the present embodiment, a current of 20–50 mA powers each LED 60–68, but other levels of current may be applied depending on the light source. A voltage source 134 which preferably ranges from 9 to 18 volts is coupled to the current regulating circuit 132. The battery of the harvester 10 may serve as the voltage source.

The voltage source 134 is coupled to two current regulator circuits 136 and 138. The current regulator circuit 136 has a voltage regulator 140 coupled to a resistor 142 which is in turn coupled in series to a variable resistor 144 and, similarly the current regulator circuit 138 has a voltage regulator 146 coupled to a resistor 148 which is in turn coupled in series to a variable resistor 150. The voltage regulators 140 and 146 are LM317 integrated circuits in the preferred embodiment, but other voltage regulator circuits may be used.

A maximum of three LEDs can be powered by each of the current regulator circuits 136 and 138 based on a minimum 9 volt supply. Thus, LEDs 60, 62 and 64 are powered by current regulator circuit 136, while LEDs 66 and 68 are powered by current regulator circuit 138. The variable resistors 144 and 150 are used to adjust the current and thus the light output of the LEDs 60–68 to compensate for varying conduit widths or varying levels of dirt build up on windows 82 and 100. For greater distances or dirtier windows, the current supply may be increased to obtain sufficient light intensity from the LEDs.

Figure 6:
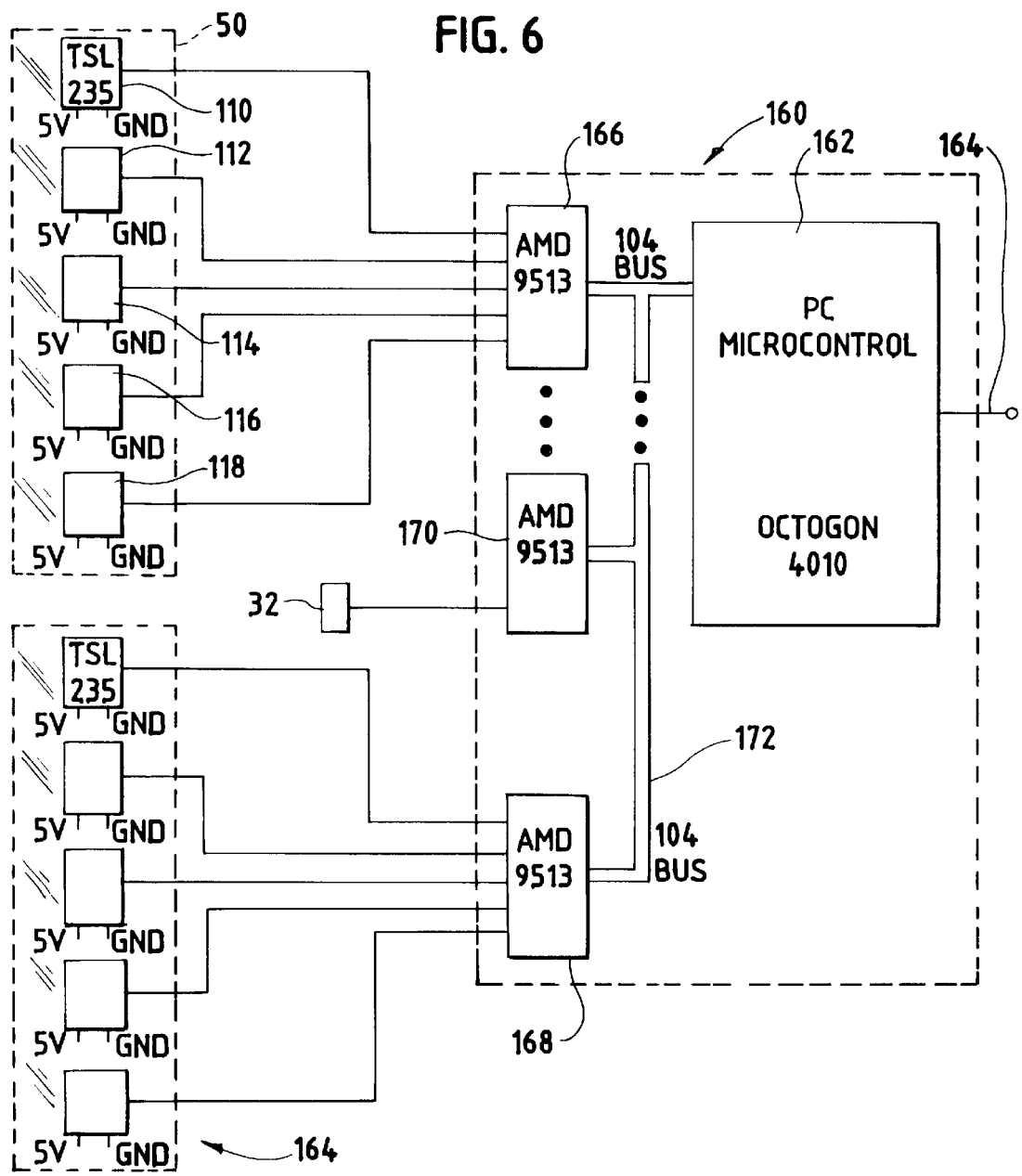
FIG. 6 is a block diagram of processor circuit of the flow sensor according to the present invention.

FIG. 6 is a diagram of a signal processing block 160 which is connected to detector unit 50 of the sensor 40. The processing block includes a processor circuit 162. The processor circuit 162 is an Octagon Model 4010 25 MHz 486 processor with a PC-104 interface in the preferred embodiment and is capable of processing data from multiple counter channels. As will be explained, the processor circuit 162 is coupled to the detector unit 50 and is programmed to calculate the quantity of material in the flow passage passing through each light beam generated from each light source of the emitter unit 48 as a function of the signals generated by the detector unit 50 and a baseline signal indicative of the level of light detected when no material is flowing through the light beam. The algorithms used by the processor circuit 162 to calculate the quantity of material are generally contained in software programs stored in memories such as RAM, ROM or EPROM but may be in hardware form such as an ASIC if desired.

Processor circuit 162 may be coupled to additional flow sensors such as a flow sensor 164 which is similar to the sensor unit 40. The processor circuit 162 may be located in the cab 18 of the harvester 10 or in another location on harvester 10 in proximity to the various flow sensors. In operation, a typical harvester may have as many as five or more picking units with corresponding conduits which each have their own flow sensors. All of the data signals taken from the flow sensors on harvester 10 are transmitted to the processor circuit 162.

After processing data derived from the flow sensors, the processor circuit 162 sends the data in serial form through serial port 164 for storage or further processing. Of course any programmable microcontroller or microprocessor may be substituted for processing circuit 162. Alternatively a computer such as an IBM-PC with an appropriate hardware interface may process the data from the detector unit 50. Faster processors may be substituted for processing circuit 162 if greater numbers of data channels need to be analyzed. Additional processor circuits may also be used to analyze data from additional flow sensors.

The detector unit 50 includes the five light-to-frequency circuits 110–118. The digital frequency output signals from each light-to-frequency circuit 110–118 on the detector unit 50 are connected to buffers (not shown) and processed by the processor circuit 162 along with the digital frequency outputs from other detector units of other flow sensors such as sensor 164. As explained above, each light-to-frequency circuit 110–118 senses the level of light received from its respective LED 60–68. The light level represents the amount of material flowing through the conduit 26. The light-to-frequency circuits 110–118 convert the ambient light levels into a serial frequency signal. The output of the fan speed sensor 32 is also coupled to the signal processing block 160.

The signal processing block 160 has a counter circuit 166 with multiple inputs. Each output of the five light-to-frequency circuits 110–118 is coupled to an input channel of the counter circuit 166. The counter circuit 166 has outputs which are coupled to the processor circuit 162. The counter circuit 166 generates a count signal of the frequency signals generated by the light to frequency circuits 110–118. Thus, five separate counts are generated by the counter circuit 166 in the preferred embodiment.

Additional counter circuits such as counter circuit 168 may be connected to other detector units of other flow sensors such as flow sensor 164. The signal processing block 160 also has a counter circuit 170 which is coupled to the output of the fan speed sensor 32. The counter circuits 166, 168 and 170 are AMD model 9513 programmable five channel 16 bit counters in the preferred embodiment. The fan speed sensor 32 is connected to one channel of the counter circuit 170. The other four channels of the counter 170 may be connected to the fan speed sensors associated with other conduits. The outputs of the counter circuits 166, 168 and 170 are connected to a data bus 172 which transmits the serial data from the counter circuit 170 representing fan speed and the serial data from counter circuit 166 and 168 representing the total flow of material through the conduit 26 to the processor circuit 162.

Figure 7:
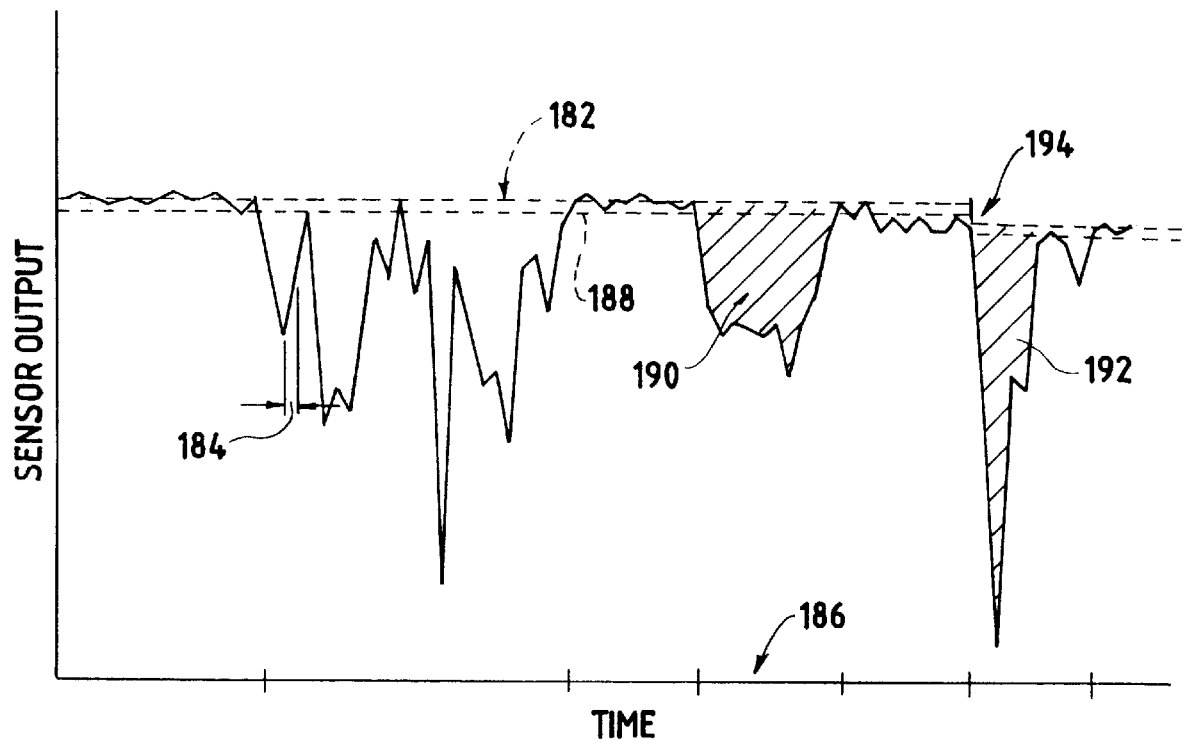
FIG. 7 is a graph of the data compiled from the counter circuit output of one of the light-to-frequency circuits according to the present invention.

FIG. 7 is an output of a typical counter such as counter 166 coupled to a light-to-frequency circuit, such as circuit 110, graphed as a function of time for varying levels of material flowing through one beam of light emitted by LED 60. Each data point on the graph represents the total number of counts read by the signal processing block 160 during a set time interval. Each data point represents the integration of the incident light energy striking the light-to-frequency circuit 110 for a predetermined sampling time. The integration of the light energy is performed by the counter circuit 166 before the data is output. The output of the counter 166 for the light-to-frequency circuit 110 has a steady-state base signal, represented by line 182, which is indicative of the light level detected when no materials are flowing through the light beam between the LED 60 and the light-to-frequency circuit 110. Digital pulses from each light-to-frequency circuit 110-118 are counted by the counter 166 for a fixed integration period 184. The processor circuit 162 periodically reads the count signals from the counter circuit 166 during this period as shown in interval 186.

In the preferred embodiment, an integration period between 100–400 ms is preferable for measuring cotton in a conduit with an air jet with a velocity between 5000–7000 fpm. The integration period is the counter circuit read/clear time interval. Periods greater than 400 ms minimize the dynamic sensitivity required for automatically computing the baseline signal as explained below. Values less than 100 ms introduce hardware errors due to delays associated with reading and clearing the counter circuit 166. However, different periods may be desired for materials other than cotton passing through the conduit 26. Additionally, shorter periods may be used with faster integrated circuit components for greater data accuracy.

Regardless of the frequency at which the counter circuit 166 is read, light energy received by the light-to-frequency circuits 110–118 is integrated over the entire time interval between counter reads so long as the counter circuit 166 does not overflow. In the preferred embodiment, the counter circuit 166 is used with a baseline frequency for the light-to-frequency circuits 110–118 of around 100 kHz and an integration period of 200 ms. Of course different frequencies and integration periods may be used to create different optimal ranges.

The signals represented by interval 190 and interval 192 represent the same volume of material but for different flow rates. The material flow represented by interval 190 is fairly uniform over 10 sampling units while the same volume of material represented by interval 192 is for a much shorter duration of time (5 sampling periods of time). The area between the baseline and the signal below the baseline for each interval 190 and 192 is very similar.

The principle of operation of the present invention is as follows with reference to FIGS. 2–7. Light beams from the LEDs 60–68 are directed through the cross-section of the conduit 26, normal to the longitudinal axis of conduit 26 and the air flow of the entrained material. The detector unit 50 detects the light from each light beam passing through the flow passage and converts the light from each light beam into a generated signal indicative of the level of light detected. Each light beam is detected by one of the light-to-frequency circuits 110–118. The light attenuation resulting from material passing through the beams of light, creates a shift in the light-to-frequency circuit's output frequency. The difference between the baseline frequency at no material flow and the frequency shift as a result of material blocking a portion of the light can be correlated with the volumetric flow rate of material conveyed past the flow sensor 40.

Interpretation of the signal from, for example, the light-to-frequency circuits 110–118 is illustrated by equations 1 and 2 below. The signal interpretation is performed by the processing circuit 162. To account for variations in sensor outputs within a detector unit, the total number of counts, $X_k$, from each light to frequency circuit 110–118 is subtracted from the base line signal for that circuit ($X_{base}$). This difference, in pulse counts, is directly proportional to the average light attenuation for a given integration period.

$$X_n = \frac{X_{base} - X_{k'}}{X_{base}} \tag{1}$$

Therefore, the scaler value for each light-to-frequency circuit 110–118, $X_n$, is the difference between the baseline signal ($X_{base}$) and the total number of counts, $X_k$, read by the counter circuit 166 for a set integration period divided by the baseline signal. The manipulation is performed for each circuit 110–118 in the detector unit 50 scaling the output of each circuit 110–118 to a value between 0 and 1.

The predicted mass flow measured by the detector unit 50 is based on the following equation:

$$M = c_1\sqrt{FS}(c_2X_1 + c_3X_2 + \ldots + c_{n+1}X_n) \tag{2}$$

where the total mass flow rate of material (M) is a function of the individual $X_n$ multiplied by a weighted calibration coefficient based on the light-to-frequency circuit's location in the cross section of the conduit 26. Coefficient $c_1$ is a scaler value determined experimentally. Values for coefficients $c_2$–$c_{n+1}$ are computed based on an experimental field calibration technique to compensate for variations in flow velocity across the cross section of the conduit 26. Variation in total flow within the conduit 26 is adjusted using the fan speed (FS) measured from the fan speed sensor 32 as an indirect measure of overall air velocity variability in the conduit 26. This term may be omitted if air velocities remain fairly consistent while the flow sensor 40 is being used.

An algorithm programmed in the processor circuit 162 automatically adjusts the baseline reference frequency ($X_{base}$) due to changes in steady-state signal frequencies under a no material flow condition. A common problem when using optics in a confined conduit is the accumulation of dust and other residue on the glass windows 82 and 100. To automatically correct for a baseline shift, the processor circuit 162 continually computes a running signal mean and standard deviation from the count signals over a selected period of time (2 or 3 seconds in the preferred embodiment). As shown in FIG. 7, the dynamics of the signal during material flow through the light beams creates a relatively high standard deviation as compared to periods where no material flow is sensed. If the standard deviation is less than a pre-defined value, the processor circuit changes the baseline frequency signal to the computed signal mean as shown at line 194.

To minimize the accumulation of error due to noise the actual value for $X_{base}$ is offset by a predetermined value as shown by the difference between line 182 and line 188. This reduces the accumulation of error due to signal noise under a no flow condition. With the photo-electronics used in the emitter unit 48 and detector unit 50 in the preferred embodiment, the light attenuation can vary over two orders of magnitude before the glass windows 82 and 100 must be cleaned.

The quantities of materials which are calculated by the processor circuit 162 are crop yield data which may be analyzed at certain times which corresponding to crop yields in individual areas of a field. Such yield data may also be analyzed in order to determine whether the harvester machinery 10 is functioning properly. Real time measurement of the crops being harvested may also serve to determine whether a choke condition in a conduit has occurred. For example, if one flow sensor does not detect any flow of material while other flow sensors continue to measure material flows, an alarm signal may be generated by the processor circuit 162 to warn the operator that a choke condition may have occurred. Suitable delays may be programmed into the processor circuit 162 to account for false signals in the event momentary loss of a flow sensor signal.

It will be apparent to those skilled in the art that various modifications and variations can be made in the method and system of the present invention without departing from the spirit or scope of the invention. For example, the principles of the present invention are not restricted to measuring cotton flow. Any material, such as grain or wood chips, which may be transported through a conduit and for which a real time flow volume count is desired may be measured using the present invention. Obviously, the present invention may use different flow rates and conduit shapes by adjusting the processing algorithm, optics and circuitry. Additionally, the principles of the invention are not restricted to mobile equipment such as harvesters. Any stationary processing or transport machinery where it is desirable to non-intrusively measure flow rates in real time may utilize the present invention.

Thus, it is intended that the present invention cover modifications and variations that come within the scope of the spirit of the invention and the claims that follow.

What is claimed is:

1. A material transport system having a conduit defining a flow passage through which entrained solid materials are transported between inlet and outlet ends of the conduit in a direction parallel to the longitudinal axis of the conduit, a flow sensor, the flow sensor comprising:

an emitter unit including a light source positioned to project a light beam through the flow passage in a direction normal to the longitudinal axis of the conduit to contact the solid materials flowing therethrough;

a detector unit positioned substantially opposite the emitter unit to receive light passing through the flow passage and not attenuated by materials in the flow passage and convert light into a generated signal indicative of the level of light detected; and a processor circuit coupled to the detector unit and having means to calculate the quantity of material in the flow passage passing through the light beam, as a function of the detector unit generated signal and a baseline signal indicative of the level of light detected when no material is flowing through the light beam.

2. The flow sensor of claim 1 wherein the light source is a light emitting diode.

3. The flow sensor of claim 2 wherein the light emitting diode produces light in the visible spectrum.

4. The flow sensor of claim 2 wherein the light emitting diode produces light in the infra red spectrum.

5. The flow sensor of claim 1 wherein the detector unit further includes:

a photodiode;

a current to voltage converter coupled to the photodiode; and an analog to digital converter coupled to the current to voltage converter.

6. The flow sensor of claim 1 wherein the detector unit further includes:

a photodiode;

a current to voltage converter coupled to the photodiode; and a voltage to frequency converter coupled to the current to voltage converter.

7. The flow sensor of claim 1 wherein the detector unit includes a light to frequency circuit that produces a frequency signal proportional to the level of detected light.

8. The flow sensor of claim 7 which further comprises:

a counter circuit having
     an input coupled to the light to frequency circuit;
     an output coupled to the processor circuit;
     and wherein the counter circuit generates a count signal of the frequency signals generated by the light to frequency circuit; and wherein the baseline signal has a frequency indicative of the light level detected when no materials are flowing through the light beam; and wherein the processor circuit calculates a flow rate of the entrained material through the light beam for a period of time as a function of the baseline frequency and the count signal over the period of time.

9. The flow sensor of claim 7 wherein:
the conduit has walls defining a passage of substantially rectangular cross section;
the emitter unit includes:
   a first light transparent window mounted between the air entrained materials and the light source in one of the walls defining the flow passage;
   a light focusing lens placed between the first window and the light source; and wherein
the detector unit includes:
   a second light transparent window mounted in a wall of the conduit opposite the wall containing the first window and between the air entrained materials and the light to frequency circuit;
   a double convex lens positioned between the second window and the light to frequency circuit.

10. The flow sensor of claim 9 further comprising slits in the walls of the conduit in which the windows are mounted permitting air flow from outside the conduit into the flow passage, the slits being located upstream of the first and second windows.

11. The flow sensor of claim 10 further comprising louvers extending inwardly into the flow passage from the vicinity of an upstream edge of the slits to aspirate air into the flow passage and provide a layer of air over the first and second windows to prevent accumulation of particles on the windows.

12. The flow sensor of claim 8 wherein:
the processor circuit periodically reads the count signals from the counter and computes a signal mean and a standard deviation from the count signals read over a selected period of time, and wherein the processor changes the baseline signal to the computed signal mean if the standard deviation is less than a predetermined value.

13. The flow sensor of claim 1 wherein the entrained materials are harvested cotton.

14. The flow sensor of claim 8 wherein:
the emitter unit includes a plurality of light sources, each of the light sources positioned to project a light beam through the flow passage in a direction normal to the longitudinal axis of the conduit; and
the detector unit includes:
   a plurality of light to frequency circuits positioned substantially opposite the plurality of light sources of the emitter unit;
   wherein each of the plurality of light to frequency circuits receives light passing through the flow passage and converts light into a generated frequency signal indicative of the level of light detected; and
the counter circuit is coupled to each of the plurality of light to frequency circuits and generates a count signal for each of the frequency signals generated by each of the light to frequency circuits; and
the processor circuit has means to calculate the quantity of material in the flow passage as a function of the generated frequency signals and baseline frequency signals indicative of the level of light detected when no material is flowing through the light beams.

15. A material transport system having a conduit defining a flow passage through which entrained materials are transported between inlet and outlet ends of the conduit in a direction parallel to the longitudinal axis of the conduit, a flow sensor, the flow sensor comprising:
an emitter unit including a light source positioned to project a light beam through the flow passage in a direction normal to the longitudinal axis of the conduit;
a detector unit positioned substantially opposite the emitter unit to receive light passing through the flow passage and convert light into a generated signal indicative of the level of light detected, wherein the detector unit includes a light to frequency circuit that produces a frequency signal proportional to the level of detected light;
a processor circuit coupled to the detector unit and having means to calculate the quantity of material in the flow passage passing through the light beam, as a function of the detector unit generated signal and a baseline signal indicative of the level of light detected when no material is flowing through the light beam;
a counter circuit having
   an input coupled to the light to frequency circuit;
   an output coupled to the processor circuit;
   and wherein the counter circuit generates a count signal of the frequency signals generated by the light to frequency circuit; and
wherein the baseline signal has a frequency indicative of the light level detected when no materials are flowing through the light beam; and
wherein the processor circuit calculates a flow rate of the entrained material through the light beam for a period of time as a function of the baseline frequency and the count signal over the period of time; and wherein the processor includes means for calculating the total flow rate of entrained materials, M, through the conduit according to the formula:

$$M = c_1 \sqrt{FS} (c_2 X_1 + c_3 X_2 \ldots + c_{n+1} X\ hd\ n)$$

wherein $c_1$ is a scaler value determined experimentally, coefficients $c_2 - c_{n+1}$ are computed based on an experimental field calibration technique to compensate for variations in flow velocity, $\sqrt{FS}$ is an indirect measure of air velocity variability in the conduit, $X_1 - X_n$ are each the difference between the baseline signal for one of the plurality of light to frequency circuits and the count signal read from the one of the plurality of light to frequency circuits for a selected time period divided by the baseline signal.

16. A method of determining the quantity of entrained solid materials flowing through a material transport system having a conduit defining a flow passage through which air entrained materials are transported between inlet and outlet ends of the conduit in a direction parallel to the longitudinal axis of the conduit, the method comprising the steps of:
projecting a light beam through the flow passage to contact the solid materials flowing therethrough in a direction normal to the longitudinal axis of the conduit;
detecting the light from the light beam passing through the flow passage and the entrained materials;
converting the light into a generated signal indicative of the level of light detected; and
calculating the quantity of material in the flow passage passing through the light beam as a function of the generated signal and a baseline signal indicative of the level of light detected when no material is flowing through the light beam.

17. The method of claim 16 wherein the light beam is projected by a light emitting diode.

18. The flow sensor of claim 17 wherein the light emitting diode produces light in either the visible or infra red spectrum.

19. The method of claim 16 further comprising the steps of:

converting the generated signal into a frequency signal proportional to the level of detected light; and converting the base line signal into a frequency signal proportional to the level of light detected when no material is flowing through the light beam.

20. The method of claim 19 further comprising the steps of:

integrating the frequency signals over a period of time;

generating a count signal based on the frequency signals integrated.

21. The method of claim 20 further comprising the step of:

periodically reading the count signals;

calculating a signal mean;

calculating a signal standard deviation;

changing the baseline signal to the computed signal mean if the signal standard deviation is less than a predetermined value.

22. The method of claim 16 further comprising the steps of:

projecting a plurality of light beams through the flow passage in a direction normal to the longitudinal axis of the conduit;

detecting the light from each light beam passing through the flow passage;

converting the light from each light beam into a generated signal indicative of the level of light detected;

converting the generated signal from each light beam into a frequency signal proportional to the level of detected light;

integrating the frequency signals for each light beam over a period of time;

generating a count signal for each light beam based on the integrated frequency signals; and calculating the quantity of material in the flow passage as a function of the count signals and a baseline frequency signal for each light beam indicative of the level of light detected when no material is flowing through the light beam.

23. A method of determining the quantity of entrained materials flowing through a material transport system having a conduit defining a flow passage through which air entrained materials are transported between inlet and outlet ends of the conduit in a direction parallel to the longitudinal axis of the conduit, the method comprising the steps of:

projecting a plurality of light beams through the flow passage in a direction normal to the longitudinal axis of the conduit;

detecting the light from each light beam passing through the flow passage;

converting the light from each light beam into a generated signal indicative of the level of light detected;

converting the generated signal from each light beam into a frequency signal proportional to the level of detected light;

integrating the frequency signals for each light beam over a period of time;

generating a count signal for each light beam based on the integrated frequency signals; and calculating the quantity of material in the flow passage as a function of the count signals and a baseline frequency signal for each light beam indicative of the level of light detected when no material is flowing through the light beam; and wherein the total flow rate of entrained materials, M, through the conduit is calculated according to the formula:

$$M = c_1 \sqrt{FS}(c_2 X_1 + c_3 X_2 \ldots + c_{n+1} X_n)$$

wherein $c_1$ is a scaler value determined experimentally, coefficients $c_2$–$c_{n+1}$ are computed based on an experimental field calibration technique to compensate for variations in flow velocity, $\sqrt{FS}$ is an indirect measure of air velocity variability in the conduit, $X_1$–$X_n$ are each the difference between the baseline signal for one of the light beams and the count signal read from the light beams for a selected time period divided by the baseline signal.

* * * * *